(12) United States Patent
Hess et al.

(10) Patent No.: US 8,018,461 B2
(45) Date of Patent: Sep. 13, 2011

(54) DEVICE AND METHOD FOR GENERATING A TEXT OBJECT

(75) Inventors: Philipp Hess, Grosshansdorf (DE); Bernd Thomas, Holzgerlingen (DE)

(73) Assignee: Navigon AG, Hamburg (DE)

( * ) Notice: Subject to any disclaimer, the term of this patent is extended or adjusted under 35 U.S.C. 154(b) by 992 days.

(21) Appl. No.: 11/923,794

(22) Filed: Oct. 25, 2007

(65) Prior Publication Data
US 2008/0266298 A1  Oct. 30, 2008

(30) Foreign Application Priority Data
Nov. 7, 2006  (DE) .......................... 10 2006 052 663

(51) Int. Cl.
G06T 11/00 (2006.01)
(52) U.S. Cl. ......... 345/467; 345/468; 345/471; 345/472
(58) Field of Classification Search .................. 345/467, 345/471, 472; 715/256, 269
See application file for complete search history.

(56) References Cited

U.S. PATENT DOCUMENTS

| | | | | |
|---|---|---|---|---|
| 5,539,868 A | * | 7/1996 | Hosoya et al. ................. | 345/471 |
| 5,606,658 A | * | 2/1997 | Hirono .......................... | 345/471 |
| 5,809,467 A | * | 9/1998 | Otsuka et al. ................. | 704/260 |
| 5,852,447 A | | 12/1998 | Hosoya et al. | |
| 2001/0039474 A1 | * | 11/2001 | Hayashi et al. ............... | 701/208 |
| 2006/0235825 A1 | | 10/2006 | Wong et al. | |
| 2006/0261965 A1 | | 11/2006 | Cieler et al. | |
| 2008/0082913 A1 | * | 4/2008 | Lloyd ........................... | 715/246 |

FOREIGN PATENT DOCUMENTS

| | | |
|---|---|---|
| DE | 10158226 | 5/2003 |
| DE | 10348628 | 5/2005 |
| EP | 0940795 | 9/1999 |
| EP | 1174843 | 1/2002 |
| JP | 10301929 | 11/1998 |
| WO | 0063848 | 10/2000 |

OTHER PUBLICATIONS

Search Report for EP 07 019 325.

* cited by examiner

*Primary Examiner* — Xiao Wu
*Assistant Examiner* — Scott E Sonners
(74) *Attorney, Agent, or Firm* — Quarles & Brady LLP (57) ABSTRACT

A device and a method for generating a text object, in particular, for a geographic map illustration. The text object comprises a multitude of letters and serves for identifying, for example, a geographic characteristic on the map illustration. The text object comprises several letters, the font sizes or spacings of which are reduced relative to the spacings between the other letters of the text object. The text object can be displayed on monitors with small dimensions, particularly in the field of navigation systems. It is also possible to display larger text objects such as, for example, long street names on small navigation monitors such that they can be easily recognized without occupying valuable monitor space required for other purposes.

9 Claims, 4 Drawing Sheets

FIG. 1

Schottmue...

DEVICE AND METHOD FOR GENERATING A TEXT OBJECT

CROSS-REFERENCE TO RELATED APPLICATION

This application claims the priority benefit of German Patent Application No. 10 2006 052 663.5 filed on Nov. 7, 2006, the contents of which are hereby incorporated by reference as if fully set forth herein.

STATEMENT CONCERNING FEDERALLY SPONSORED RESEARCH OR DEVELOPMENT

Not applicable.

FIELD OF THE INVENTION

The present invention relates generally to a device and method for generating a graphic display, in particular, of a geographic illustration with a text object.

BACKGROUND OF THE INVENTION

Devices and methods for displaying, for example, geographic or cartographic illustrations—in which the graphic illustrations comprise text objects—are frequently used, for example, in navigation systems. In the typical application in navigation systems, it is generally required to process geographic illustrations and, in particular, map illustrations in such a way that they can be illustrated on a display device of the navigation system, for example, on a monitor.

In addition to the display of geographic illustrations and map illustrations, it is usually also required to display text objects on the monitor of navigation systems.

Text objects of this type generally serve for the textual identification of certain geographic characteristics that are currently illustrated on the display device of the navigation system and for identifying map characteristics such as, for example, cities, roads, landmarks, landscape characteristics, etc.

However, most conventional navigation systems feature comparatively small display devices or monitors, on which a multitude of graphic information, as well as additional text information, needs to be frequently illustrated. In order to improve the orientation of the user of a navigation system, for example, roads, cities and other geographic or landscape characteristics are usually provided with a textual identification that needs to be accommodated on the available monitor surface—in addition to the graphic illustration of the corresponding characteristics.

In the pertinent state of the art, one frequently encounters the problem that the space or text illustration area available on the monitor of the navigation system is in many cases insufficient for displaying the text information provided or required for correspondingly informing the user on the monitor with the desired detail and in a legible font size.

This means that the solutions according to the state of the art frequently represent a compromise, in which only part of the required or desired text information can actually be displayed on the monitor. In alternative navigation systems known from the state of the art, for example, text information is either only illustrated in abbreviated form, in which case the legibility and the intuitive comprehension of the information deteriorate, or a very small font size is the chosen which frequently also results in an insufficient perceptibility. Under certain circumstances, this may even lead to a safety problem, namely if the user of a navigation system needs to devote an excessive amount of concentration to reading text that is illegible or difficult to comprehend, for example, reading road names on the monitor of the navigation system.

SUMMARY OF THE INVENTION

In the light of these circumstances, the present invention provides a device and a method for generating a text object on a display device which respectively makes it possible to eliminate the disadvantages of the state of the art. The device and method provides the option of also displaying larger text objects on small navigation monitors, namely without utilizing space on the monitor that is required for other purposes. It can furthermore be possible to flexibly adapt the method and the device to the respective amount of text to be illustrated or to realize the method and the device such that they automatically adapt to the respective amount of text to be illustrated, respectively.

An embodiment of the present invention is a device comprising a display device with a processor that is designed for graphically displaying a geographic illustration, particularly a map illustration, on the display device. The graphic illustration comprises at least one text object comprising a multitude of letters, for example, for identifying a geographical characteristic of the map illustrated on the display device. In this case, the processor can be designed, in particular, for converting the text object into an abbreviated form such that it can be displayed on the display unit in a space-saving fashion.

According to a further embodiment of the invention, the device can be characterized, however, in that the converted text object comprises several letters, the font sizes of and/or spacings between which are reduced or compressed relative to the original font size of the remaining letters of the text object or relative to the spacings between the remaining letters, respectively. This makes it possible to also illustrate comparatively large text objects, for example, long street names and the like, on the frequently relatively small display devices of navigation systems without having to abbreviate the text objects such that the legibility is impaired. It is furthermore possible to forgo the illustration of complete text objects in undersized fonts that can barely be deciphered. It is initially unimportant which letters of the text object are illustrated in their original font size and which letters of the text object are illustrated in a smaller font or with a smaller spacing between the letters.

According to an embodiment of the invention, however, at least one letter or preferably several letters at the beginning of the text object can be displayed in their original font size while all ensuing letters of the text object are reduced or compressed relative to the original font size or spaced apart by smaller distances. This is advantageous in that the first letter or the beginning of a word is particularly important with respect to the ability to quickly recognize the meaning of a word. This applies all the more, for example, to street names, the ending of which usually consists, e.g., of street, drive, avenue, etc., and therefore contains little information in comparison with the beginning of the word. In other words, the first letter or the beginning of the text object has the original font size or a maximum font size to be defined while the ensuing remainder of the text object letters have a correspondingly reduced or compressed font size and/or are spaced apart by smaller distances. This makes it possible to illustrate the entire text object on the monitor without having to abbreviate the text object in a possibly distorting fashion, wherein the text object also requires significantly less space on the monitor—due to the reduced font size or compression of the back portion of the text object.

According to another embodiment of the invention, it is also proposed that at least one letter at the beginning of the text object can have the original font size or a maximum size to be defined, wherein a multitude of ensuing letters of the text object can be illustrated in fonts that become successively smaller and/or are spaced apart by successively smaller distances in the reading direction. This embodiment of the invention can make it possible to achieve a more uniform transition between the letters at the beginning of the text object which are displayed on the monitor in their original font size and the letters at the end of the text object that have a correspondingly smaller font size and/or are spaced apart by correspondingly smaller distances on the monitor. The advantages of this embodiment therefore can be seen, in particular, in the additionally improved legibility.

According to another embodiment, at least two letters at the end of the text object can have the same relative font sizes and/or are spaced apart from one another by the same distances. In contrast to the previously described embodiment, this means that ensuing letters are not additionally reduced in size beginning at a certain point toward the end of the text object because this would only save little additional space while an additional reduction of the font size would impair the perceptibility of the text object.

According to other embodiments of the invention, at least one letter at the beginning and at the end of the text object respectively can have the original font size. The letters lying in between, however, can have a reduced or compressed font size referred to the original font size and/or are spaced apart by smaller distances. In this case, the letters lying in between may, for example, can have a font size that is reduced by the same amount or successively reduced in the reading direction, for example, up to the center of the text object and then successively increased again in the reading direction to the end of the text object. This makes it possible to substantially reduce the space occupied by the text object on the monitor and to simultaneously preserve the essential components of its appearance—particularly the character of the so-called envelope—which are responsible for the intuitive perception of the entire text object at a glance.

According to another embodiment of the invention, the respective letters of at least one syllable at the beginning and at the end of the text object can have the original font size while the letters of at least one syllable that lies between the beginning syllable and the final syllable can be reduced referred to the original or source font size and/or spaced apart by smaller distances. This embodiment additionally improves the legibility of the text object because the reduction of the front size of the letters or of the spacing between the letters takes place in accordance with the syllable boundaries of the text object. Consequently, only the letters of complete syllables can be respectively displayed in their original font size or in a converted font size in this embodiment while abrupt changes in the font size only occur at syllable boundaries.

According to another embodiment of the invention, the font sizes of converted letters of the text object can be changed in one dimension only, preferably in the x-direction. This embodiment is advantageous in that this only reduces the length of the text object while the height of the letters remains unchanged. The space or illustration area available for the text object on the monitor of the navigation device can be utilized particularly well in this fashion. In addition, the envelope that provides a decisive contribution to the intuitive perception of a word or text object can be preserved particularly well on the monitor despite the saving in space.

According to another embodiment of the invention, the inventive device can be designed for automatically determining the maximum font size of each letter of the text object, wherein the maximum font size of the respective letters is defined in dependence on the illustration area available for the text object on the monitor, for example, of a navigation system, as well as in dependence on the number of letters of the text object.

Another embodiment furthermore pertains to a method for generating a text object comprising of a multitude of letters of a certain font size or font width in order to illustrate the text object on a graphic display unit by means of a processor. The text object comprises several letters, the font sizes of and/or spacings between which can be reduced relative to the original font size or relative to the spacings between the remaining letters of the text object. The method can include the process steps listed below.

A mathematical functional correlation that links the font size of a letter and/or the letter spacing with the position of a letter within the text object can be initially defined in a first process step, wherein the chosen functional correlation comprises at least the variables "serial number of the letter," "number of letters in the text object," "current font width," "maximum font width" and "minimum font width." Subsequently, the integral from 1 up to the number of letters in the text object can be formed as a function of the chosen mathematical functional correlation in another process step, after which the thusly formed integral is equated with the maximum permissible length of the text object in another process step. The obtained integral equation can be subsequently solved in another process step for the unknown "minimum font width" based on a given value for the maximum font width or for the unknown "maximum font width" based on a given value for the minimum font width. Subsequently, the font width of each letter of the text object and/or the respective spacings between the letters of the text object can be determined in another process step by inserting the numerical values for the minimum font width, for the maximum font width, for the number of letters in the text object and for the serial number of the current letter into the chosen mathematical functional correlation. Finally, the display unit can be controlled in accordance with the determined font sizes and/or spacings of the individual letters of the text object by the processor in another process step.

Consequently, the method can make it possible to automatically obtain a converted text object based on the maximum illustration area available for displaying the text object on the monitor and based on a given mathematical functional correlation, wherein the individual letters or letter spacings of the converted text object can be converted in dependence on the available illustration area in such a way that they respectively assume their maximum permissible size.

The method can be realized independently of the chosen mathematical functional correlation. According to one embodiment, however, the mathematical functional correlation can correspond to a linear equation with negative gradient. This corresponds to a text object, in which the letters linearly become successively smaller in the reading direction starting at the beginning of the text object. This embodiment of the invention can provide the advantage of being particularly easy to realize and merely requiring a minimum of computing capacity for determining the font sizes of the letters of the text object.

According to another embodiment, the mathematical functional correlation can correspond to a descending curve with leftward curvature. This embodiment can result in a particularly effective and particularly space-saving conversion of the text object because the font sizes of the letters or the spacings between the letters decrease particularly fast in the reading direction starting at the beginning of the text object, but are only subjected to a slight additional reduction toward the end.

According to other embodiments, the mathematical functional correlation can correspond to a descending curve with a subsequent end section that extends horizontally or a subsequent curve that reascends in the end region of the text object. The former embodiment can provide the advantage, in particular, of a font size or letter spacing that initially decreases rapidly, wherein the font sizes or letter spacings in the region of the end of the text object or word remain constant instead of being decreased additionally in order to improve the legibility. The latter embodiment can be advantageous in that improved legibility can also be achieved in this case because only the central section of the text object or word is reduced in size such that the envelope is better preserved.

According to other embodiments, the mathematical functional correlation can correspond to a descending Gaussian curve or to a Gaussian curve that descends in the region of the beginning of the text and reascends in the region of the end of the text. This utilization of the Gaussian curve—that is also referred to as integral number function—can be advantageous in that an additionally improved legibility can be achieved in this fashion because more letters respectively have the same size in this case. The Gaussian curve that descends in the region of the beginning of the text and reascends in the region of the end of the text can also be particularly advantageous with respect to the fact that the beginning of a word as well as the end of a word can be better recognized in the sense of an intuitive perception of the text object.

According to another embodiment, the abrupt changes in the font size which occur within the text object due to the utilization of the Gaussian curve as the mathematical functional correlation can be positioned at syllable boundaries of the text object. A particularly well intuitive perception of the converted text object is achieved with this embodiment due to the fact that the syllable-by-syllable illustration is emphasized—similar to the conventional syllabification—such that the eye is provided with additional information in order to quickly and effortlessly recognize the respective text object or word.

The invention is described in greater detail below with reference to the figures that merely show exemplary embodiments.

DETAILED DESCRIPTION OF THE EXAMPLE EMBODIMENTS

FIGS. 1 and 2 to 5 respectively show a schematic representation of a mathematical functional correlation for converting a text object, as well as a text object converted in accordance with the respective mathematical functional correlation.

Figure 1:
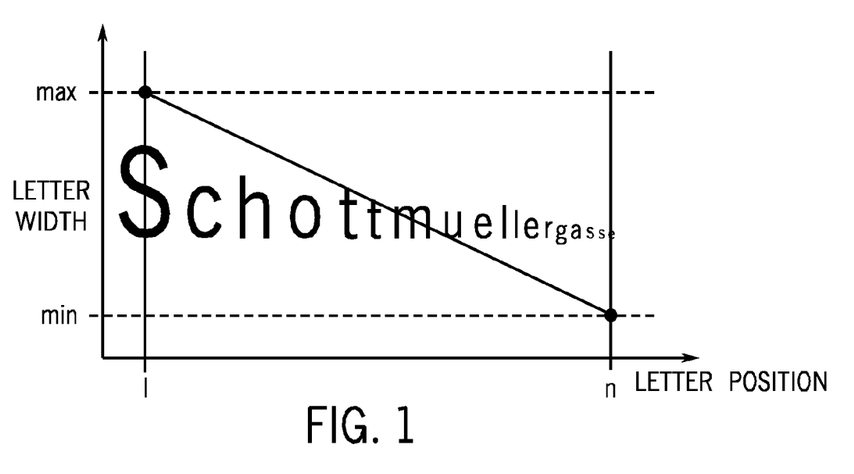
FIG. 1 is a schematic representation of a linearly descending mathematical functional correlation and a corresponding text object according to one embodiment of the present invention.

In this case, the functional correlation according to FIG. 1 corresponds to a linearly descending line. This means that the letters of the text object according to FIG. 1 have a font size that uniformly decreases in the reading direction, as well as a letter spacing that also uniformly decreases.

Figure 1A:
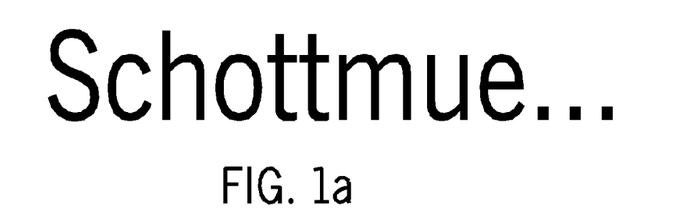
FIG. 1*a* illustrates the word beginning of the text object shown in FIG. 1 in the original font size without converted letters.

The beginning of the same text object is illustrated in FIG. 1*a*, however, without conversion in order to elucidate the significantly reduced space requirement of a thusly converted text object. One can ascertain that the original length of the text object already by far exceeds the available space or illustration area on the drawing sheet.

Figure 2:
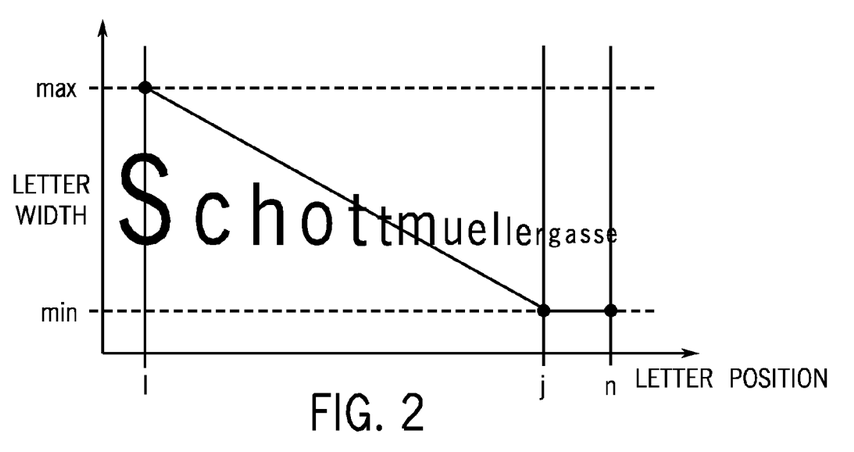
FIG. 2 is a linearly descending and constantly ending mathematical functional correlation and a corresponding text object according to another embodiment of the present invention, namely in the form of a representation that corresponds to that shown in FIG. 1.

FIG. 2 shows an alternative mathematical functional correlation, as well as the corresponding text object converted with the aid of this functional correlation. The functional correlation according to FIG. 2 initially corresponds to the linearly descending line according to FIG. 1 which is followed by a linear section with zero incline in the region of the end of the text object. A highly effective compression of the text object is realized in this fashion, wherein a superior legibility is achieved due to the fact that the letters in the region of the end of the text object do not fall short of a certain minimum font size.

Figure 3:
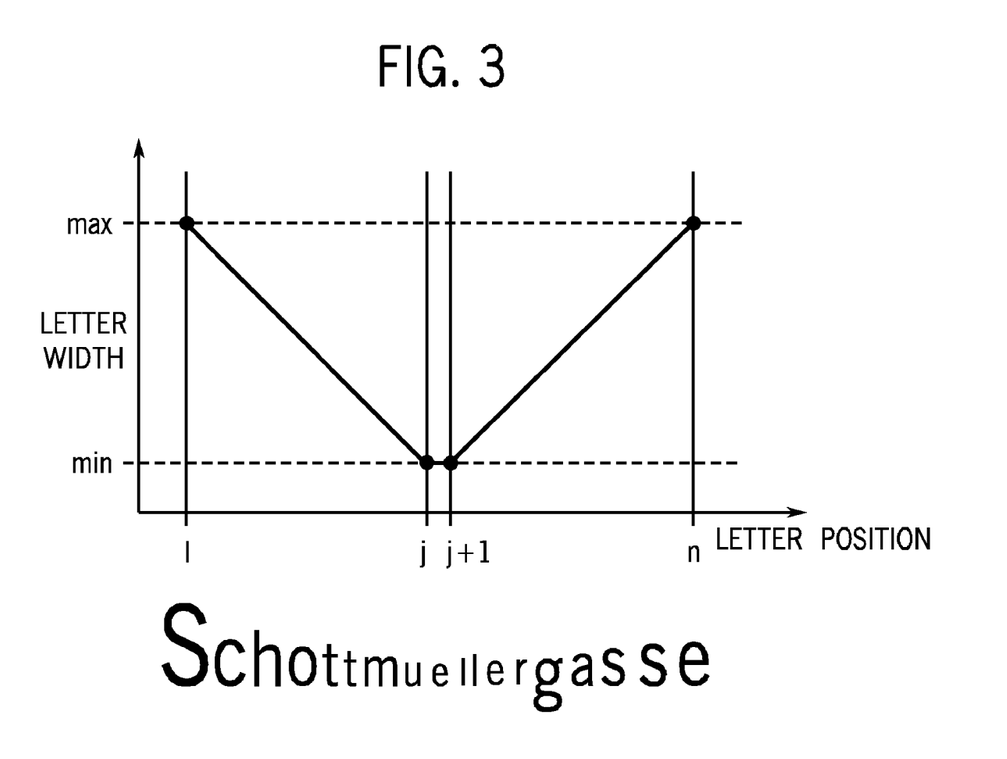
FIG. 3 is a linearly descending and linearly reascending mathematical functional correlation and a corresponding text object according to another embodiment of the present invention, namely in the form of a representation that corresponds to that shown in FIGS. 1 and 2.

According to the representation shown in FIG. 3, the mathematical functional correlation once again corresponds to a function that initially descends linearly and is followed by a short linear section with a zero incline, as well as a linearly reascending line. An effective compression of the corresponding text object shown in FIG. 3 is achieved in this fashion, wherein an essentially symmetric shape or envelope for the text object is preserved. The intuitive and fast perception of the text object at a glance can be improved in this fashion, particularly due to the fact that the letters at the beginning and at the end of the text object which are particularly important for the fast perception of the entire word or text object respectively remain at the original font size or have the maximum font size, respectively.

Figure 4:
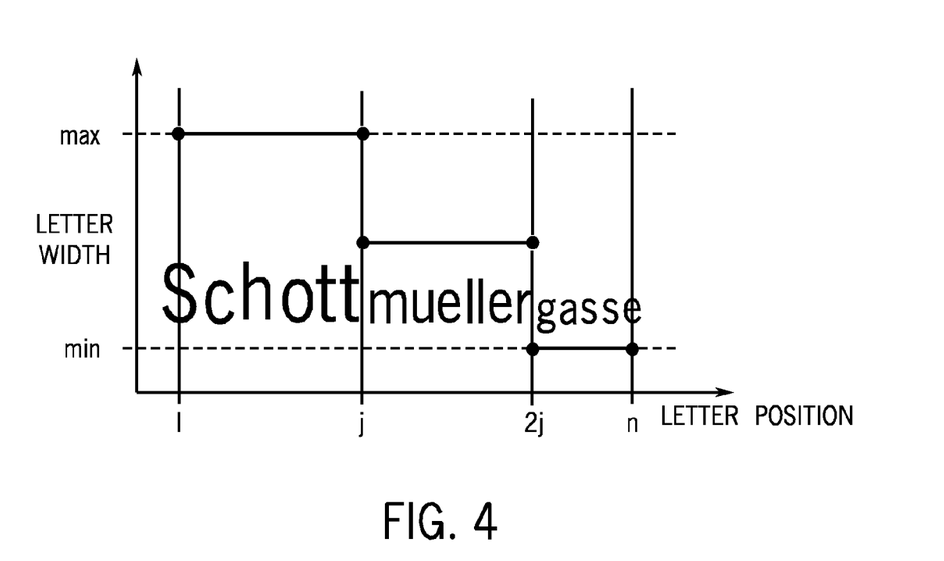
FIG. 4, a mathematical functional correlation realized in the form of a descending Gaussian curve and a corresponding text object according to another embodiment of the present invention, namely in the form of a representation that corresponds to that shown in FIGS. 1, 2 and 3.
Figure 5:
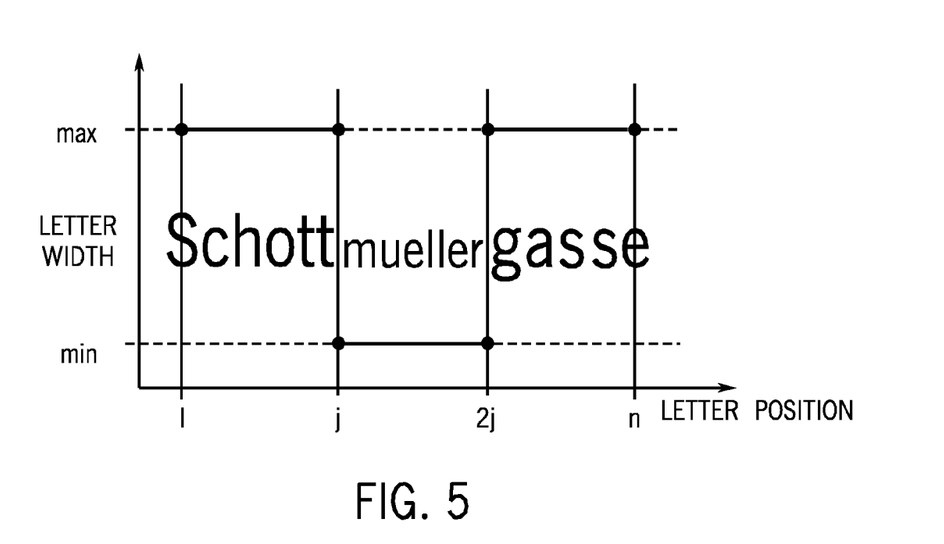
FIG. 5, a mathematical functional correlation realized in the form of a descending and reascending Gaussian curve and a corresponding text object according to another embodiment of the present invention, namely in the form of a representation that corresponds to that shown in FIGS. 1 and 2 to 4.

According to the representations shown in FIGS. 4 and 5, a so-called Gaussian curve is respectively used as mathematical functional correlation. The Gaussian curve that is also referred to as integral number function, floor function or rounding function respectively delivers an output value in the form of the highest integral number that is smaller or equal to the input value. According to FIGS. 4 and 5 and, in particular, the corresponding converted text objects, a step-by-step change in the font sizes and letter spacings can be realized by utilizing the Gaussian curve.

Figure 6:
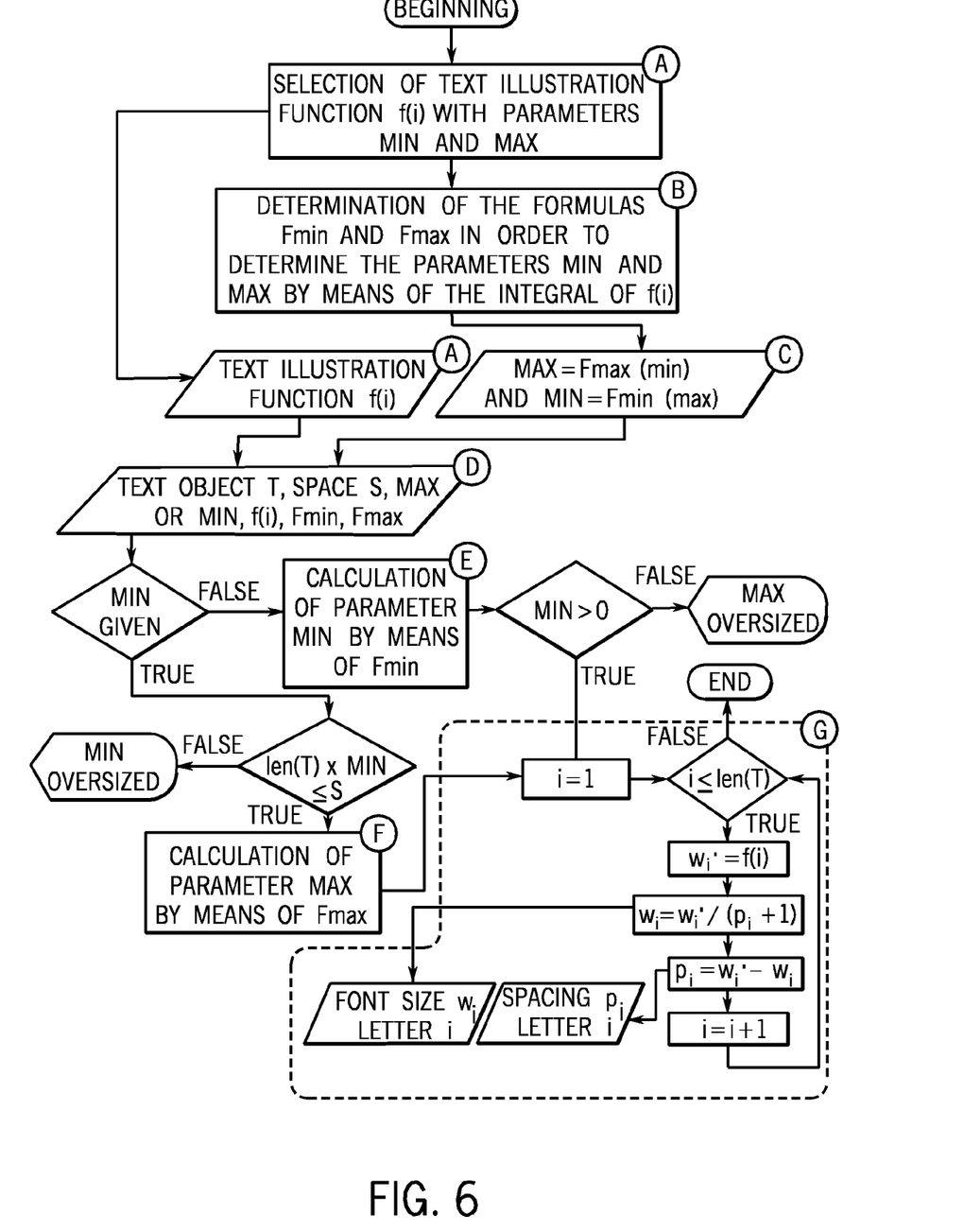
FIG. 6, an exemplary representation of the sequence of one embodiment of the present invention.

FIG. 6 shows an exemplary representation of the sequence of one embodiment.

The illustrated sequence is based on the following specifications and variable designations:

T is a text object to be illustrated and n is the length (number of letters) of the text object;

the i-th letter of the text object T is referenced with $T_i$, and $w_i$ stands for the font size of the letter $T_i$;

min stands for in the minimum illustration width (font size of the letter including letter spacing) that a letter can assume;

max stands for the maximum illustration width that a letter can assume;

regardless of min or max, it is assumed that each letter of the alphabet is provided with the same illustration space (example: the illustration of the letter "I" occupies exactly as much space as the illustration of the letter "X");

S stands for the maximum space available on the display device for illustrating the text object T, and s stands for the actual space or illustration area required by the text object T;

p stands for the spacing between two letters of the text object T; the spacing between the two successive letters $T_i$ and $T_{i+1}$ is identified by the reference symbol $p_i$, and the spacing factor $p_f$ designates the ratio between the width $w_i$ of the letter $T_i$ and the spacing $p_i$ between the successive letters $T_i$ and $T_{i+1}$.

On the assumption that each letter of the text object T is illustrated with the same font size, this results in the illustration area s required for illustrating the text object T at a given font size w, a given letter spacing p and a given text object T is defined by $$s = n \times w + (n-1) \times p$$

In other words, the illustration area s required for illustrating the text object T is defined by the sum $$s = w_1 + p_1 + w_2 + p_2 + \ldots + p_{n-1} + w_n.$$

On the further assumption that the letter spacing $p_i$ is proportionally dependent on the respective font size $w_i$, as well as based on the indication of this ratio between the letter spacing and the font size in the form of the spacing factor $p_f$ (e.g., $p_f = 1/3$), the spacing $p_i$ between the letter i and the letter i+1 can be expressed by $p_i = w_i \times p_f$.

This initially results in the overall space $w'_i$ (=illustration width of the letter) occupied by a letter being defined as the sum of the font size w and the letter spacing p. Consequently, the utilization of the spacing factor $p_f$ results in an illustration width $w'_i$ for the letter i in the form of $$w'_i = w_i + w_i \times p_f$$

Accordingly, the font size $w_i$ of the i-th letter is expressed in the form of $$w_i = \frac{w'_i}{p_f + 1}$$

for a given illustration width $w'_i$ of a letter $T_i$, and the spacing from the ensuing letter is expressed in the form of $p_i = w'_i - w_i$.

The problem to be solved with the inventive method can be seen in that the illustration area s which is actually required by a text object T is larger than the space S available on the display device. The available space S therefore is not sufficiently large for illustrating the text object T with the chosen font size w and the chosen letter spacing p. This means that "required illustration area>available space," i.e., s>S or in more elaborate terms:

$$w_1 + p_1 + w_2 + p_2 + \ldots + p_{n-1} + w_n > S$$

The insertion of the spacing factor $$p_f = \frac{p_i}{w_i}$$

results in:

$$w'_1 + w'_2 + \ldots + w'_n > S + (w_n \times p_f)$$

With respect to the objective of accommodating the entire text object T within the space S available on the display device, it is disadvantageous, however, that the font size $w_i$ is reduced by the same factor for all letters $T_i$ because this can lead to the illegibility of the text object T due to a font size that may be altogether excessively small in this case.

The reduction of all spacings $p_i$ between the letters $T_i$ is also subject to a certain lower limit. In the sense of a superior legibility, it should be precluded, in particular, that adjacent letters $T_i$ overlap and/or contact one another. Despite this restriction, the entire text object T should be illustrated legibly and at least intuitively perceptive. The scaling of all letters $T_i$ with a constant factor therefore must be excluded from the solution to the problem.

An embodiment, in contrast, comprises only reducing the font size of certain letters of the text object T in such a way that the maximum space S available for illustrating the text object T on the display device corresponds to the actually required illustration area s of a text object T.

This requires a function $w'_i = f(i)$ that defines a corresponding font size $w'_i$ for each letter $T_i$ at a given a maximum illustration area of the size S, as well as a given text object T with the length n and a given spacing factor $p_f$ in such a way that the sum of the function values of $w'_i = f(i)$ becomes smaller or equal to the available space S over the length of the text object T:

$$\sum_{i=1}^{n} f(i) \leq S \qquad (1)$$

The illustration area $$s = \sum_{i=1}^{n} f(i)$$

that is actually used for illustrating the text object T should simultaneously become as large as possible, i.e., it should ideally be identical to the available space S.

To simplify matters, it should furthermore be ignored that the width of the last letter $T_n$ of the text object T is actually calculated excessively large in this fashion because no more letters follow the last letter $T_n$ and the character spacing $p_n$ taken into account for the last letter $T_n$ in the form of $w'_n$ is unnecessary. However, this merely results in a small portion of the available space S not being taken into account in the calculation, wherein this can be corrected, if so required, by simply modifying the calculation described below.

An embodiment comprises the two segments described below:

Illustration type:
The determination of suitable functions f(i) for illustrating the letters $T_i$ of the text object T with respect to optimal legibility and with consideration of perception criteria; see reference letter A in the sequence illustrated in FIG. 6; and Scaling:
The calculation of the font sizes $w_i$ by means of f(i) such that the set condition—"the length of the illustrated text is not greater than S"—is fulfilled; see reference letters B to G in the sequence illustrated in FIG. 6.

Different forms of illustrating the text object T with varying font sizes can be respectively described by a function f(i) in such a way that the corresponding font size $w_i$ is calculated for a given letter position i of the text object T to be illustrated. In this case, the calculation of the font size, however, also needs to be carried out in dependence on the available space S. The latter is realized by correspondingly parameterizing the respectively chosen function f(i).

This means that it needs to be determined in dependence on the available space S and the length of the text object T how the maximum illustration width max and the minimum illustration width min of a letter must be chosen for a given illustration function f(i) such that the entire text object T converted by means of the function f(i) is not longer than the available space S.

Different illustration functions f(i) for the text object T can be found, and a few examples thereof are provided in the following Table 1. In this case, the selection of one of the text illustration functions f(i) corresponds to the step identified by the reference letter A in the sequence illustrated in FIG. 6.

TABLE 1

Examples of text illustration functions

| Name | FIG. | Function |
|---|---|---|
| F1 | 1 | $f(i) = \dfrac{\min - \max}{n-1} \times (i-1) + \max$ |
| F2 | 2 | $f(i, j) = \begin{cases} \dfrac{\min - \max}{j-1} \times (i-1) + \max & \text{for } i < j \\ \min & \text{else} \end{cases}$ |
| F3 | 3 | $f(i) = \begin{cases} \dfrac{\min - \max}{j-1} \times (i-1) + \max & \text{for } i \leq j \\ \dfrac{\max - \min}{n-(j+1)} \times (i-(j+1)) + \min & \text{for } i > j \end{cases}$ |
| F4 | 4 | $f(i) = \max - \dfrac{\max - \min}{k-1} \times \text{floor}\left(\dfrac{i-1}{j}\right)$ with $j = \dfrac{n}{k}$ and $k > 1$ number of segments with $j \leq n$ |
| F5 | 5 | $f(i) = \begin{cases} \max & \text{for } i \leq j \\ \min & \text{for } j < i \leq n-j \\ \max & \text{else} \end{cases}$ with $j < \dfrac{n}{2}$ with $j \leq n$ |

The procedures for determining the parameters max (maximum illustration width) and min (minimum illustration width) are explained below with reference to an exemplary observation of the function F1.

According to the problem definition which states that the maximum space S available for illustrating the text object T needs to correspond to the illustration area s actually required by a text object T, the following applies with (1)

$$\sum_{i=1}^{n} f(i) = S \quad (2)$$

With f(i)=F1 according to Table 1, this results in $$\sum_{i=1}^{n} \frac{\min - \max}{n-1} \times (i-1) + \max = S \quad (3)$$

In this case, the available space S and the number of letters n are defined from the beginning. In order to also recognize the smallest letters of the text object T, this description refers to an instance in which the parameter min (minimum illustration width) is also defined. Instead of defining the minimum illustration width min, the described method can also be carried out by defining the maximum illustration width max.

With respect to condition (3), one can ascertain that the obtained sum of all letter illustration widths just corresponds to the integral from 1 to n over F1 and therefore the area under the exemplary illustration function F1. Consequently, the cited integral needs to exactly correspond to the maximum space S available for illustrating the text object T in order to accommodate the correspondingly converted text object T within the available space S.

If suitable values for the parameters min and max can be found with respect to F1 such that the sum of the illustration widths $w'_i$ is equal to the available space S, i.e., if the integral of F1 becomes equal to S, the text object T can be converted in such a way that it just occupies the entire available space S.

Consequently, the integral shown below needs to be observed with respect to the illustration function F1. This step corresponds to the reference letter B in FIG. 6.

$$\int_{1}^{n} F1(x) \, dx = \frac{n \times (\max - \min)}{2} + n \times \min \quad (4)$$

Under the condition (2) that the entire space S available for the illustration be utilized, this integration results in the following correlation for determining the parameters max (maximum letter illustration width) and min (minimum letter illustration width):

$$\frac{n \times (\max - \min)}{2} + n \times \min = S$$

$$\Leftrightarrow n \times \left(\frac{\max - \min}{2} + \min\right) = S$$

$$\Leftrightarrow n \times \left(\frac{\max}{2} + \frac{\min}{2}\right) = S$$

$$\Leftrightarrow \frac{n}{2} \times (\max + \min) = S$$

-continued $$\Leftrightarrow \max = \frac{2S}{n} - \min \quad (5)$$

$$\Leftrightarrow \min = \frac{2S}{n} - \max \quad (6)$$

In this case, the reference letter C in the sequence illustrated in FIG. 6 corresponds to this determination of the parameters max (maximum illustration width) and min (minimum illustration width).

Corresponding formulas for determining the parameters max and min can also be established in accordance with the described procedure for the other examples of illustration functions f(i), F2 to F5 (see also FIGS. 2 to 5) listed in preceding Table 1. This is respectively realized in an entirely analogous fashion in the form of an integration of f(i), i.e., based on the determination of the area under the illustration function f(i). Table 2 shows the resulting formulas for the parameter determination.

TABLE 2

Parameter determination by integration

| Name | FIG. | Formula for parameter determination |
|------|------|-------------------------------------|
| F2 | 2 | $\frac{j \times (\max - \min)}{2} + n \times \min = S$ |
|    |   | $\Leftrightarrow \max = \frac{2S}{j} + \min - \frac{2n}{j} \times \min$ |
|    |   | $\Leftrightarrow \min = \frac{2S - j \times \max}{-j + 2n}$ |
| F3 | 3 | $\frac{1}{2} \times n \times (\max - \min) + n \times \min = S$ |
|    |   | $\Leftrightarrow \max = \frac{2S}{n} - \min$ |
|    |   | $\Leftrightarrow \min = \frac{2S}{n} - \max$ |
| F4 | 4 | $n \times \frac{1}{2} \times (\max - \min) + n \times \min = S$ |
|    |   | $\Leftrightarrow \max + \min = \frac{2S}{n}$ |
|    |   | $\Leftrightarrow \max = \frac{2S}{n} - \min$ |
|    |   | $\Leftrightarrow \min = \frac{2S}{n} - \max$ |
| F5 | 5 | $2j \times \max + (n - 2j) \times \min = S$ |
|    |   | $\Leftrightarrow \max = \frac{2S}{n} - \min$ |
|    |   | $\Leftrightarrow \max = \frac{2S}{n} - \min$ |

This results in embodiments of the present invention making available a general method, in which a text illustration function f(i) containing both parameters min and max is defined in a first step (reference letter A in FIG. 6) for a desired text illustration with varying font size $w'_i$.

In another step (reference letter B in FIG. 6), the area under the chosen text illustration function f(i) is subsequently determined in dependence on min and max by means of an integration of f(i), and the parameter formulas $F_{min}$ and $F_{max}$ for determining the respectively unknown parameter min or max are derived therefrom (reference letter C in FIG. 6) by solving the integral equation.

Depending on the respective application, in which either an upper limit (max) or a lower limit (min) is defined for the font size $w'_i$ (reference letter D in FIG. 6), the other unknown parameter value min or max is subsequently determined in another step by inserting the known parameter value max or min into the parameter formulas $F_{min}$ and $F_{max}$ (reference letters E and F in FIG. 6).

Subsequently, the font size $w'_i = f(i)$ is calculated (see reference letter G in FIG. 6) for each letter by looping each value of i between 1 and n—based on the letter position i in the text object T and based on the given maximum space S available.

The following example elucidates how the text T=Schottmuellergasse with the length n=18 can be placed within an illustration area with an assumed size S=120 at a given minimum font size $w'_i$ of min=5 and a given spacing factor $$p_f = \frac{1}{3}.$$

In this example text illustration function $$f(i) = \frac{\min - \max}{n - 1} \times (i - 1) + \max$$

(F1, see Table 1 and FIG. 1) is utilized.

Initially, formula (5) for the text illustration function F1 which is derived as shown by means of integration $$\max = \frac{2S}{n} - \min$$

is used for determining the maximum font size max based on the given minimum font size min in the form of $$\max = \frac{2 \times 120}{18} - 5 = 13,33 - 5 = 8,33$$

The following results for F1 if the numerical values are inserted $$f(i) = \frac{5 - 8,33}{17} \times (i - 1) + 8,33$$

therefore resulting in the following linear equation for determining the size of the individual letters:

$$f(i) = -0,20 \times (i-1) + 8,33 \quad (7)$$

Table 3 shows the font sizes $w_i$ and letter spacings $p_i$ that belong to the linear equation (7) determined as the solution and result for the exemplary text Schottmuellergasse and the predetermined values for n, min, $p_f$ and S if i is inserted into the determined equation (5).

TABLE 3

Calculation example

| Serial No. | Letter | Illustration width $w'_i = w_i + p_i$ | Font size $w_i$ | Letter spacing $p_i$ |
|---|---|---|---|---|
| 1 | S | 8.33 | 6.25 | 2.08 |
| 2 | c | 8.14 | 6.10 | 2.03 |
| 3 | h | 7.94 | 5.96 | 1.99 |
| 4 | o | 7.75 | 5.81 | 1.94 |
| 5 | t | 7.55 | 5.66 | 1.89 |
| 6 | t | 7.35 | 5.51 | 1.84 |
| 7 | m | 7.16 | 5.37 | 1.79 |
| 8 | u | 6.96 | 5.22 | 1.74 |
| 9 | e | 6.76 | 5.07 | 1.69 |
| 10 | l | 6.57 | 4.93 | 1.64 |
| 11 | l | 6.37 | 4.78 | 1.59 |
| 12 | e | 6.18 | 4.63 | 1.54 |
| 13 | r | 5.98 | 4.49 | 1.50 |
| 14 | g | 5.78 | 4.34 | 1.45 |
| 15 | a | 5.59 | 4.19 | 1.40 |
| 16 | s | 5.39 | 4.04 | 1.35 |
| 17 | s | 5.20 | 3.90 | 1.30 |
| 18 | e | 5.00 | 3.75 | 1.25 |
| | Sums | 120.00 | 90.00 | 30.00 |

One can ascertain that the font size $w_i$ successively decreases from the value max=8.33 to the initially predetermined minimum value min=5 in the reading direction of the text object "Schottmuellergasse," and that the sum of all letter illustration widths for i=1 to 18 exactly corresponds to the available space S=120.

It therefore becomes clear that at least some of the example embodiments provide a device and a method for generating a text object which makes it possible to overcome the limitations in illustrating text encountered in the state of the art, particularly on monitors with small dimensions. Especially in the field of navigation systems at least some of the example embodiments therefore also make it possible to display larger text objects such as, for example, long street names on small navigation monitors without occupying valuable monitor space required for other purposes.

Consequently, at least some of the example embodiments provide a decisive contribution to improving, in particular, the illustration of road maps on the monitors of navigation systems, as well as for improving the intuitive perception of the monitor contents and therefore also the safety of the user during the utilization of navigation systems in road traffic.

LIST OF REFERENCE SYMBOLS

T Text object
i Position of the letter in the text object
$T_i$ i-th letter of the text object
n Number of letters in the text object
min Minimum letter illustration width
max Maximum letter illustration width
$w'_i$ Illustration width of the i-th letter
$w_i$ Font size of the i-th letter
p Letter spacing
$p_i$ Letter spacing between $T_i$ and $T_{i+1}$
$p_f$ Spacing factor
s Required space
S Available space
f(i), $F_1 \ldots F_5$ Text illustration functions
j, k Parameter for Gaussian curve
$F_{min}$, $F_{max}$ Formula for determining min and max
A . . . G Process steps

We claim:

1. A method for generating a text object (T) that comprises a plurality of letters ($T_i$) in order to illustrate the text object on a graphic display unit by means of a processor, wherein the text object (T) comprises several letters, at least one of the font sizes ($w_i$) and spacings ($p_i$) of which are reduced relative to the original font size or relative to the spacings between the other letters of the text object (T), the method comprising:
   a) selecting a mathematical functional correlation ($F_i$) between the position (i) of a letter ($T_i$) within the text object (T) and the letter width ($w'_i$), wherein the functional correlation ($F_i$) comprises at least the following variables
      i. serial number of the letter (i)
      ii. number of letters in text object (n);
      iii. letter width ($w'_i$) of the current letter ($T_i$); maximum letter width (max); and minimum letter with (min);
   b) forming the integral from 1 up to the number (n) of letters in the text object (T) over the mathematical functional correlation ($F_i$);
   c) equating the formed integral with the maximum permissible length (S) of the text object (T);
   d) solving the integral equation for the unknown "minimum letter width" (min) or for the unknown "maximum length width" (max);
   e) determining the letter width ($w'_i$) of each letter ($T_i$) of the text object (T) and/or the respective spacings ($p_i$) between the letters of the text object (T) by inserting the numerical values for the minimum letter width (min), for the maximum letter width (max), for the number of letters in the text object (n) and for the serial number of the current letter (i) in the mathematical functional correlation, and
   f) controlling the display unit in accordance with the determined font sizes ($w'_i$, $w_i$) and/or spacings ($p_i$) of the individual letters of the text object by means of the processor.

2. The method of claim 1, wherein the mathematical functional correlation ($F_i$) corresponds to a linear equation with negative gradient.

3. The method of claim 1, wherein the mathematical functional correlation ($F_i$) corresponds to a descending curve with leftward curvature.

4. The method according to claim 1, wherein the mathematical functional correlation ($F_i$) corresponds to a descending curve with an ensuing end section that extends horizontally.

5. The method of claim 1, wherein the mathematical functional correlation ($F_i$) corresponds to a curve that descends in the region of the beginning of the text and reascends in the region of the end of the text.

6. The method of claim 1, wherein the mathematical functional correlation ($F_i$) corresponds to a descending Gaussian curve.

7. The method according to claim 6, wherein the text object (T) comprises a plurality of syllables and abrupt changes in the font size within the text object (T) are positioned at transitions between syllables.

8. The method of claim 1, wherein the mathematical functional correlation ($F_i$) corresponds to a Gaussian curve that ascends in the region of the beginning of the text and reascends in the region of the end of the text.

9. The method of claim 8, wherein the text object (T) comprises a plurality of syllables and abrupt changes in the font size within the text object (T) are positioned at transitions between syllables.

* * * * *